US008851660B2

(12) United States Patent
Furukawa

(10) Patent No.: US 8,851,660 B2
(45) Date of Patent: Oct. 7, 2014

(54) METHOD FOR MANUFACTURING INK JET RECORDING HEAD

(75) Inventor: Masao Furukawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 899 days.

(21) Appl. No.: 13/022,008

(22) Filed: Feb. 7, 2011

(65) Prior Publication Data

US 2011/0225824 A1 Sep. 22, 2011

(30) Foreign Application Priority Data

Mar. 17, 2010 (JP) ................................. 2010-060846

(51) Int. Cl.
*G06F 19/00* (2011.01)
*B41J 2/16* (2006.01)

(52) U.S. Cl.
CPC ................ *B41J 2/16* (2013.01); *B41J 2202/19* (2013.01); *B41J 2/1623* (2013.01)
USPC .................. 347/104; 347/100; 347/5; 347/23

(58) Field of Classification Search
USPC ......................... 700/114; 347/100, 104, 5, 23
See application file for complete search history.

(56) References Cited

U.S. PATENT DOCUMENTS 6,960,036 B1 * 11/2005 Fujita et al. .............. 400/124.11
7,296,877 B2 * 11/2007 Chikuma et al. ................ 347/41
7,303,245 B2 * 12/2007 Kunihiro ........................... 347/5
2001/0030671 A1 * 10/2001 Fujimori ......................... 347/19
2002/0027572 A1 * 3/2002 Kato et al. ...................... 347/15
2011/0225824 A1 * 9/2011 Furukawa .................... 29/890.1

FOREIGN PATENT DOCUMENTS

| | | | |
|---|---|---|---|
| JP | 3-227634 | A | 10/1991 |
| JP | 5-238004 | A | 9/1993 |
| JP | 8-127128 | A | 5/1996 |
| JP | 10-35021 | A | 2/1998 |
| JP | 10-160431 | A | 6/1998 |
| JP | 2006-68980 | A | 3/2006 |
| JP | 2006-212848 | A | 8/2006 |
| JP | 2006-256051 | A | 9/2006 |

OTHER PUBLICATIONS

Herman Wijshoff, The dynamics of the piezo inkjet printhead operation, Physics Reports, vol. 491, Issues 4-5, Jun. 2010, pp. 77-177, ISSN 0370-1573.*

Office Action dated Oct. 22, 2013, in Japanese Application No. 2010-060846.

* cited by examiner

*Primary Examiner* — Michael D Masinick

(74) *Attorney, Agent, or Firm* — Fitzpatrick, Cella, Harper & Scinto

(57) ABSTRACT

There is provided a method for manufacturing an ink jet recording head in which a plurality of recording element substrates used for discharging ink are appropriately arranged onto a support substrate.

10 Claims, 9 Drawing Sheets

FIG. 9
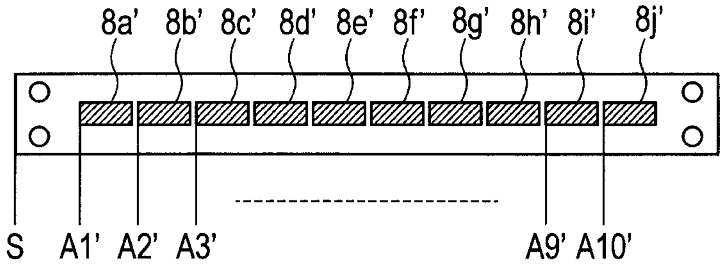
FIG. 10
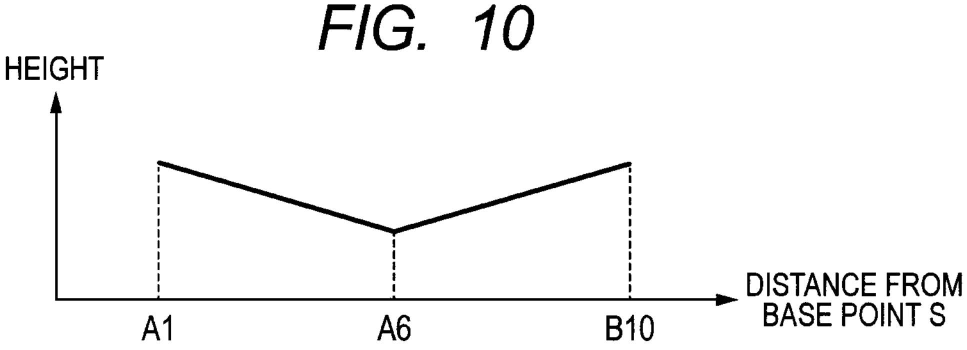
FIG. 11A
FIG. 11B
FIG. 11C
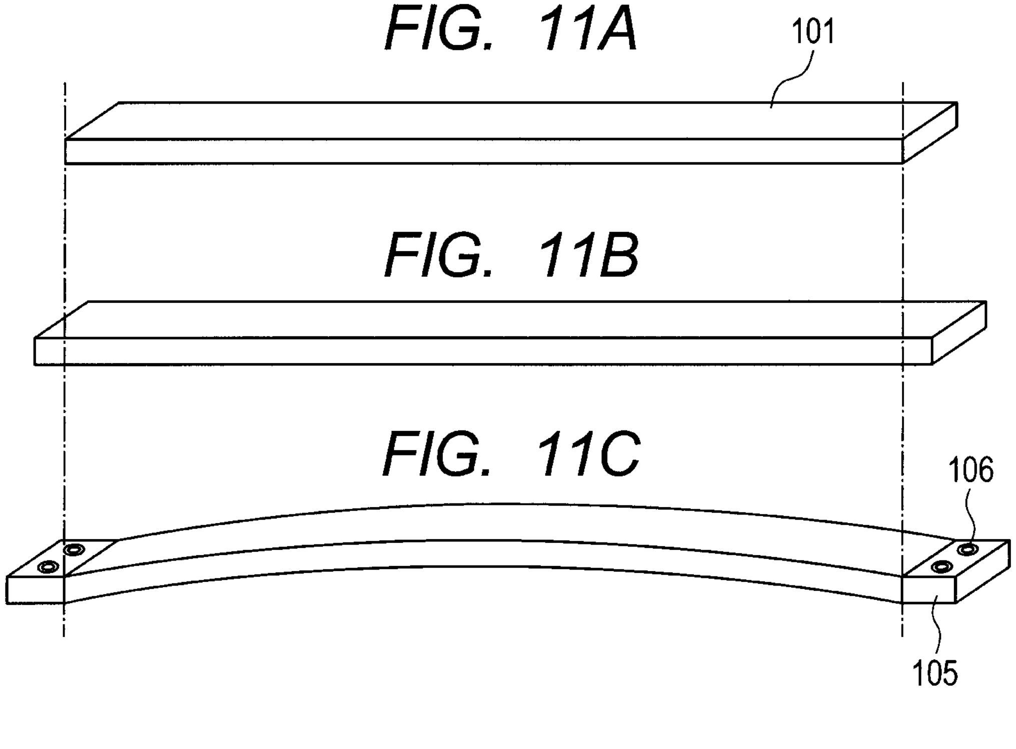

METHOD FOR MANUFACTURING INK JET RECORDING HEAD

BACKGROUND OF THE INVENTION

1. Field of the Invention

The present invention relates to a method for manufacturing an ink jet recording head used in a recording apparatus that performs a recording operation by discharging ink or the like.

2. Description of the Related Art

Ink jet recording apparatuses (hereinafter, referred to as "recording apparatus") as one type of a recording apparatus are broadly used for an output apparatus connected to a computer and the like and are commercialized. Recently, in order to perform high image-quality recording at higher speed, an ink jet recording head (hereinafter, referred to as a "recording head") having a longer recording width is desirable.

As a general recording apparatus, there is widely known a type in which a recording head having discharge ports used for discharging ink performs recording by scanning a recording medium such as a paper sheet while discharging ink. In addition, in the case of a head having a long recording width, there is also known a recording apparatus that can perform recording at high speed by fixing a recording medium on a conveying belt and scanning the recording medium.

In order to configure the recording head having a long recording width as above by using one recording element substrate, the recording element substrate needs to be formed to be long. However, in such a case, there is a very high likelihood that defective products are produced. This leads to a decrease in a yield of the recording element substrate and the like. Accordingly, a configuration is considered in which a recording head having a long recording width as a whole is realized by arranging a plurality of recording element substrates having an appropriate length (that is, an appropriate number of nozzles) on a support substrate having a length that is equal to or greater than the recording width.

However, when the support substrate is formed to be long, a warped state or undulation of the support substrate may occur. When the recording element substrates are fixed along the support substrate surface, the ink discharging direction is changed for each recording element substrate, whereby the precision of landing of ink decreases. In addition, when there is a variation in the thicknesses of the recording element substrates, a distance from a discharge port to a recording medium varies depending on each recording element substrate, whereby the precision of landing of ink decreases.

Thus, in Japanese Patent Application Laid-Open No. 2006-256051, a configuration is proposed in which surfaces forming ink discharge ports of the recording element substrates are made flush with each other by variation of the thickness of an adhesive that bonds a support substrate and the recording element substrate for each recording element substrate. In FIG. 3A of Japanese Patent Application Laid-Open No. 2006-256051, recording head units (recording element substrates) are bonded and fixed to a long substrate (support substrate) with the adhesive. Even when a warped state of the long substrate occurs or there is a variation in the thicknesses of the recording head units, the discharge port forming surfaces are made flush with each other by changing the thickness of the adhesive beneath each recording head unit.

However, in the above-described technique, there are the following problems.

In the method disclosed in Japanese Patent Application Laid-Open No. 2006-256051, in a case where an electricity-heat transducing element is used as an element that generates energy used for discharging ink, when the heat generated for discharging the ink conducts the support substrate, heat conduction differs depending on a difference in the thickness of the adhesive for each recording element substrate. In other words, the heat dissipating characteristics are different for each recording element substrate. As a result, the amount of discharged ink or the discharge speed of ink differs for each recording element substrate, whereby the recording quality is lowered.

SUMMARY OF THE INVENTION

A method for manufacturing an ink jet recording head according to this embodiment includes measuring heights of a main surface of a support substrate at least at three measurement points, and setting a reference surface that passes through two measurement points of the main surface out of the measurement points. The method further includes acquiring a distance from the measurement point that is not included in the two measurement points in the reference surface to the reference surface. It is assumed that the recording element substrates are arranged at a plurality of arrangement portions disposed on the support substrate, and the recording medium is arranged in parallel to the reference surface, at a predetermined distance from the reference surface. Under the assumption, the method further includes calculating an amount of landing deviation that is a difference between a position at which a line extending from the recording element substrate in a direction perpendicular to the reference surface intersects a recording medium and a position at which a line extending in a direction to which an ink discharge port of the recording element substrates face is directed intersects the recording medium. Furthermore, the method yet further includes determining arrangement positions of the recording element substrates on the support substrate by correcting the positions of the arrangement portions according to the amounts of landing deviation.

Further features of the present invention will become apparent from the following description of exemplary embodiments with reference to the attached drawings.

BRIEF DESCRIPTION OF THE DRAWINGS

FIG. 9 is a diagram illustrating a process of calculating an actual arrangement position of each recording element substrate.

FIG. 10 is a diagram illustrating a method for interpolating the heights of places, at which the height is not measured, according to a second embodiment.

FIGS. 11A, 11B and 11C are diagrams illustrating the deformation of a plate according to a third embodiment.

DESCRIPTION OF THE EMBODIMENTS

Figure 1:
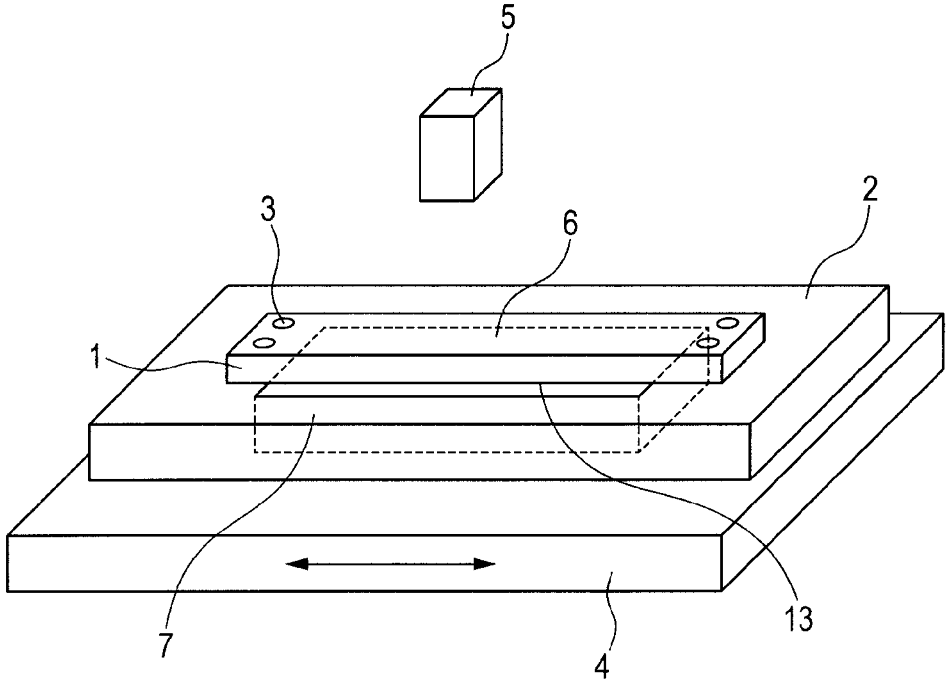
FIG. 1 is a schematic configuration diagram of a shape measuring apparatus for a support substrate.

Hereinafter, embodiments will be described with reference to the accompanying drawings. In the accompanying drawings, the same reference numeral is assigned to configurations having the same function, and the description thereof may not be repeatedly made.

Preferred embodiments of the present invention will now be described in detail according to the accompanying drawings.

FIG. 1 is a schematic configuration diagram of a shape measuring apparatus for a support substrate.

A plate stand 2 of the shape measuring apparatus, on which a support substrate 1 as a measuring object is mounted, is mounted on a stage 4 and is movable in the longitudinal directions (the directions of arrows illustrated in the figure) of the support substrate 1. In addition, a relief hole 7 is formed in the plate stand 2. Above the position located on the plate stand 2 in which the support substrate 1 is arranged, a displacement sensor 5 is disposed and is supported by a supporting means not illustrated in the figure.

Figure 2:
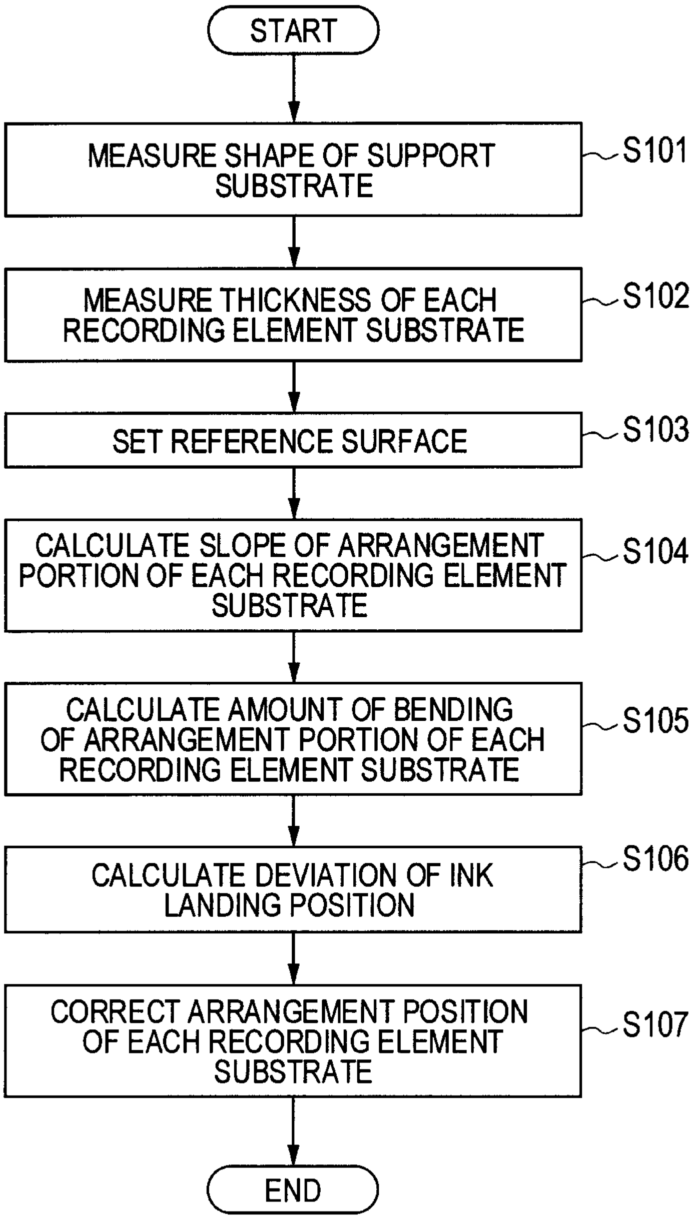
FIG. 2 illustrates a method for manufacturing an ink jet recording head according to a first embodiment and is a flowchart of determining arrangement positions of recording element substrates on the support substrate.

FIG. 2 illustrates a method for manufacturing an ink jet recording head according to a first embodiment and is a flowchart used for determining the arrangement position of a recording element substrate on the support substrate.

First, the shape of the support substrate is measured in step S101. Step S101 will now be described with reference to FIGS. 1 and 3A to 3C.

The support substrate 1 is placed on the plate stand 2, with a recording element substrate bonding surface 6 as a first main surface facing up. The surface 13 of the support substrate 1 on the opposite side of the recording element substrate bonding surface 6 is a second main surface. In addition, at both ends of the support substrate 1, bolt holes 3 used for fixing a recording head to a recording apparatus are formed at four places. The shape of the support substrate 1 may not be flat but be bent more or less in the thickness direction. As described above, the relief hole 7 is formed in the plate stand 2. Accordingly, even when the support substrate 1 is warped to protrude toward the plate stand 2 side, the support substrate 1 is stable on the plate stand 2.

Next, the positions for measuring the shape of the support substrate 1 will be described. In the recording head according to this embodiment, a plurality of recording element substrates, and more specifically, ten recording element substrates are assumed to be arranged on one support substrate 1.

Figure 3A:
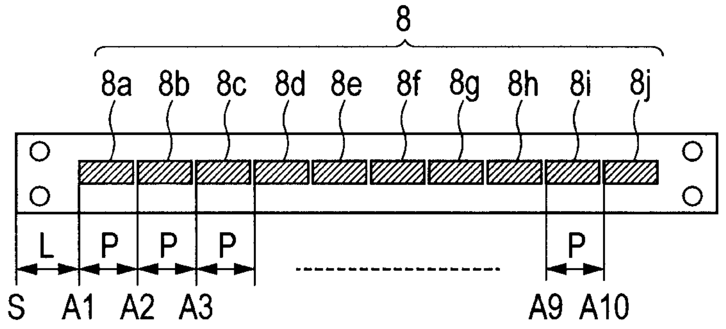
FIGS. 3A, 3B and 3C illustrate schematic top views of the support substrate.
Figure 3B:
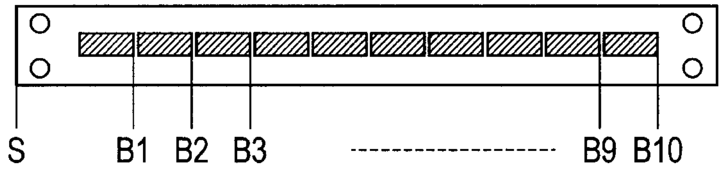
Figure 3C:
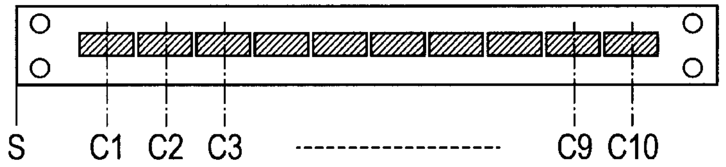

FIGS. 3A to 3C illustrate schematic top views of the support substrate 1. A plurality of arranged arrangement portions 8*a* to 8*j* represents the positions at which recording element substrates 9 (see FIG. 4) are arranged.

Here, the arrangement portions 8*a* to 8*j* will be described in detail. One corner (the left end in FIGS. 3A to 3C) of the support substrate 1 is used as a base point S, the end portion of the arrangement portion 8*a* that is located on the base point S side is set to a position A1 that is distanced from the base point S by a predetermined distance L, and a position distanced from A1 by a predetermined pitch P is the position A2 of the end portion of the arrangement portion 8*b* that is located on the base point S side (see FIG. 3A). Thereafter, similarly, positions are denoted by A3 to A10 for every pitch P. The pitch P is a length acquired by adding a predetermined gap between the recording element substrates 9, to the length of the recording element substrate 9. In addition, the end positions of the arrangement portions 8*a* to 8*j* that are located on the side farther from the base point S are denoted by B1 to B10 (see FIG. 3B), and the center positions of the arrangement portions 8*a* to 8*j* are denoted by C1 to C10 (see FIG. 3C). In this embodiment, the positions A1 to A10, B1 to B10, and C1 to C10 are used as measurement points.

When the stage 4 is scanned so that the sensing position of the displacement sensor 5 becomes each of the measurement points, that is, it becomes each of the positions A1 to A10, B1 to B10, and C1 to C10, a distance from the displacement sensor 5 to each position on the recording element substrate bonding surface 6 is measured for each position. Then, a distance from the displacement sensor 5 to the upper face of the plate stand 2 is measured. The height of the recording element substrate bonding surface 6 can be acquired from a difference between both the measured values.

When the support substrate 1 is approximately flat in the entire area of the support substrate 1 and has no roughness, the surface 13 (the second main surface) located on the opposite side of the recording element substrate bonding surface 6 may be measured by mounting the support substrate 1 upside down.

Figure 4:
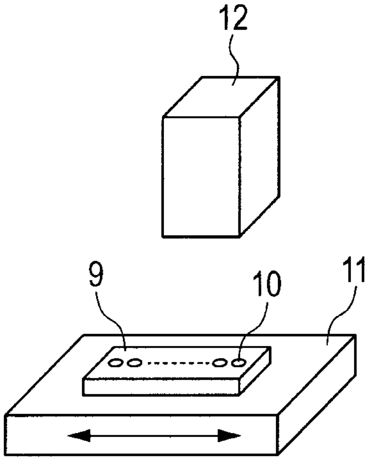
FIG. 4 is a diagram illustrating a state in which recording element substrates are mounted on a substrate stand of a thickness measuring apparatus.

Next, the thicknesses of the recording element substrates 9*a* to 9*j* are measured in step S102. Step S102 will be described with reference to FIG. 4. A thickness measuring apparatus that is used for measuring the thicknesses of the recording element substrates 9*a* to 9*j*, similarly to the above-described shape measuring apparatus, includes a movable substrate stand 11 and a displacement sensor 12. FIG. 4 illustrates the state in which the recording element substrates 9 are mounted on the substrate stand 11, to which a movement mechanism is attached, with a face having discharge ports 10 formed thereon being placed on the upper side. The displacement sensor 12 is disposed above the recording element substrates 9, i.e. at a place facing the discharge ports 10. The distances from the displacement sensor 12 to the discharge port 10 forming surface of the recording element substrate 9 and to the upper face of the substrate stand 11 are measured by the displacement sensor 12, and the thickness of the recording element substrate 9 can be acquired based on a difference between both the measured values.

As described above, in this embodiment, since ten recording element substrates 9 are arranged on one support substrate 1, the thicknesses of all the ten recording element substrates 9 are measured. Here, a recording element substrate arranged in the arrangement portion 8*a* illustrated in FIG. 3A is denoted by a reference numeral 9*a*, a recording element substrate arranged in the arrangement portion 8*b* is denoted by a reference numeral 9*b*, and similarly thereafter, a recording element substrate arranged in the arrangement portion 8*j* is denoted by a reference numeral 9*j*. In addition, the thickness of the recording element substrate 9*a* is denoted by Ta, the thickness of the recording element substrate 9*b* is denoted by Tb, and similarly thereafter, the thickness of the recording element substrate 9*j* is denoted by Tj.

In a case where a plurality of recording elements is formed on one silicon substrate using photolithography technique and is cut out into a plurality of the recording element substrates 9, the thicknesses of the recording element substrates 9 acquired by being cut out from the same silicon substrate are approximately uniform. Thus, in a case where all the recording element substrates 9 arranged on one support substrate 1 are acquired by being cut out from the same silicon substrate, measurement of the thicknesses of the individual recording element substrates 9 can be omitted. In such a case, designed thicknesses of the recording element substrates 9 may be used as the thicknesses Ta to Tj of the recording element substrates 9.

Figure 5A:
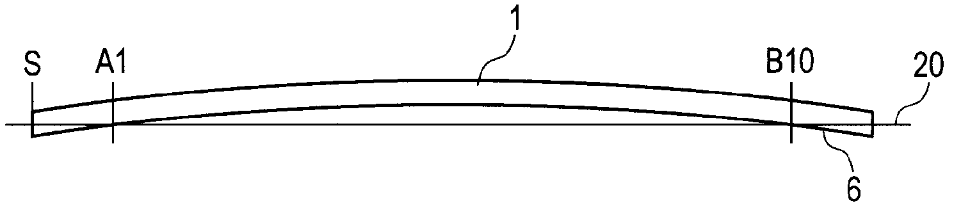
FIGS. 5A and 5B are diagrams illustrating a process of setting a reference surface.
Figure 5B:
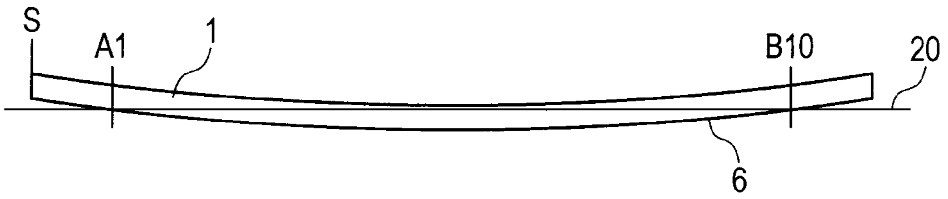

Next, an imaginary reference surface is set in step S103. Step S103 will be described with reference to FIGS. 5A and 5B. FIG. 5A is a side view of the support substrate 1 with the recording element substrate bonding surface 6 facing down and illustrates the state in which the support substrate 1 is warped in a convex shape. A surface is imagined which is acquired by adjusting the slope of the support substrate 1 in a manner that the positions of the measurement points A1 and B10 on the first main surface in step S101, that is, the positions of the measurement point A1 of the arrangement portions 8*a* to 8*j* that is closest to the base point S and the measurement point B10 that is farthest from the base point S in the height direction are within the same horizontal plane. This imaginary surface is set as a reference surface 20. Although FIG. 5B illustrates the state in which the support substrate 1 is warped in a convex shape, the method for setting the reference surface is the same as for the state in which the above-described support substrate 1 is warped in a concave shape. Also in the following step, since the same step is performed even when the direction or the shape of warping of the support substrate 1 is different, the description will be made for a case where the support substrate 1 is warped in a convex shape illustrated in FIG. 5A.

Figure 6A:
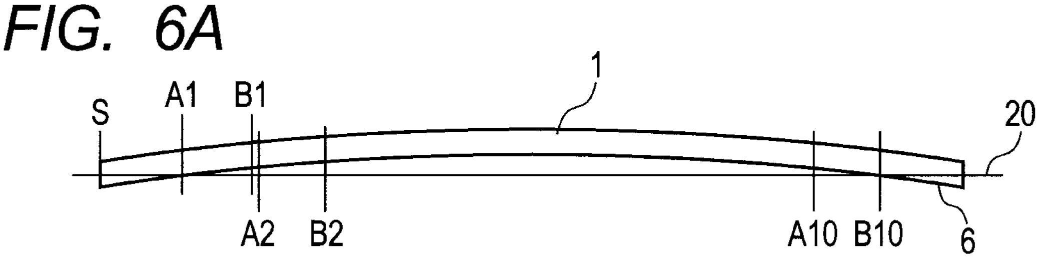
FIGS. 6A, 6B and 6C are diagrams illustrating a process of calculating the slope of each arrangement portion.

Next, a control device not illustrated in the figure calculates the slope of the arrangement portions 8*a* to 8*j* in step S104. Step S104 will be described with reference to FIGS. 6A to 6C. FIG. 6A is a side view of the entire support substrate 1 with the recording element substrate bonding surface 6 facing down.

Figure 6B:
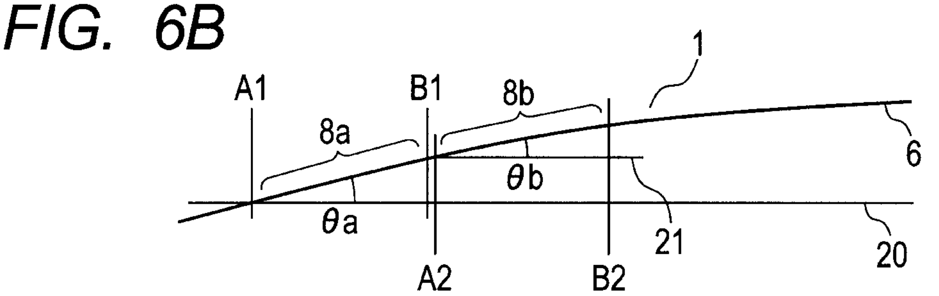
Figure 6C:
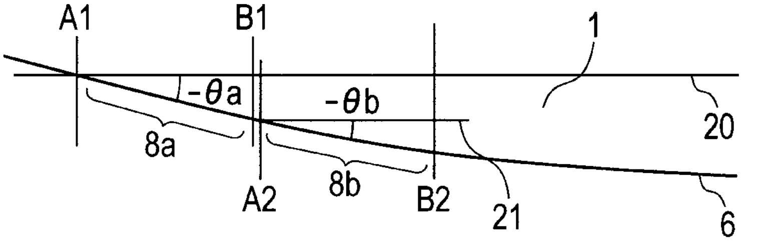

First, calculation of the slope of the arrangement portion 8*a* of the recording element substrate 9 that is located closest to the base point S will be described. FIG. 6B is an enlarged diagram of the vicinity of the arrangement portion 8*a* illustrated in FIG. 6A. A difference in heights of the measurement points A1 and B1 is acquired based on measured height values of the recording element substrate bonding surface 6 at the measurement points A1 and B1 that are measured in step S101. In addition, a distance between the measurement points A1 and B1 is the width of the arrangement portion 8*a*. Accordingly, based on the difference in the heights of the measurement points A1 and B1 and the distance between the measurement points A1 and B1, an angle θa between the arrangement portion 8*a* and the reference surface 20 is calculated. In addition, the slope θb of the arrangement portion 8*b* is an angle formed by the arrangement portion 8*b* and the reference surface 20. In order to allow the description of the slope θb to be easily understood, a surface 21 that is parallel to the reference surface 20 is illustrated in FIG. 6B. The method for calculating the slope θb is the same as that of calculating the slope θa. Similarly, up to the arrangement portion 8*j* after that, the angles between the ten arrangement portions 8*a* to 8*j* and the reference surface 20 are calculated. The calculated angles are denoted by θa to θj. The sign of the angle is positive in a case where the recording element substrate bonding surface 6 has a diagonally-right-up slope with respect to the reference surface 20 (including the parallel surface 21) and is negative in a case where the recording element substrate bonding surface 6 has a diagonally-right-down slope. For example, FIG. 6C illustrates a case where the warped shape is opposite to that illustrated in FIG. 6B, and the slope angles of the recording element substrate arrangement portions 8*a* and 8*b* have negative values in the case.

Figure 7A:
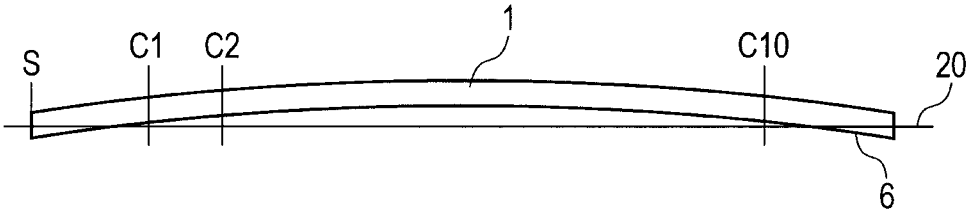
FIGS. 7A and 7B are diagrams illustrating a process of calculating a warped state of each arrangement portion.
Figure 7B:
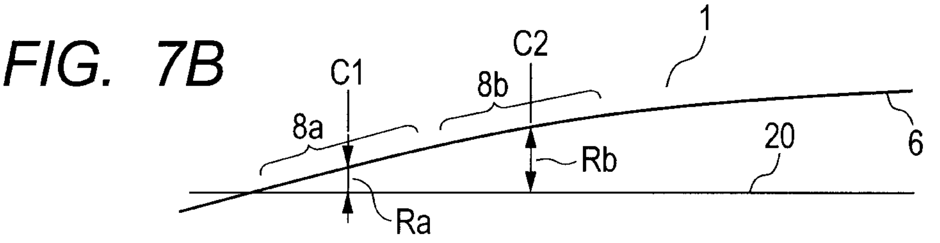

Next, the amounts of warped states of the arrangement portions 8*a* to 8*j* are calculated in step S105. Step S105 will be described with reference to FIGS. 7A and 7B. FIG. 7A is a side view of the support substrate 1 when the recording element substrate bonding surface 6 thereof faces down, and FIG. 7B is an enlarged view of the vicinity of the arrangement portions 8*a* and 8*b*. The amounts of warped states of the arrangement portions 8*a* to 8*j* are shortest distances from the recording element substrate bonding surface 6 to the reference surface 20 at the center positions C1 to C10 of the arrangement portions 8*a* to 8*j*. Here, the amount of the warped state of the arrangement portion 8*a* is denoted by Ra, and the amount of the warped state of the arrangement portion 8*b* is denoted by Rb. Similarly after that, the amount of the warped state of the arrangement portion 8*j* is denoted by Rj (not illustrated in the figure).

Figure 8A:
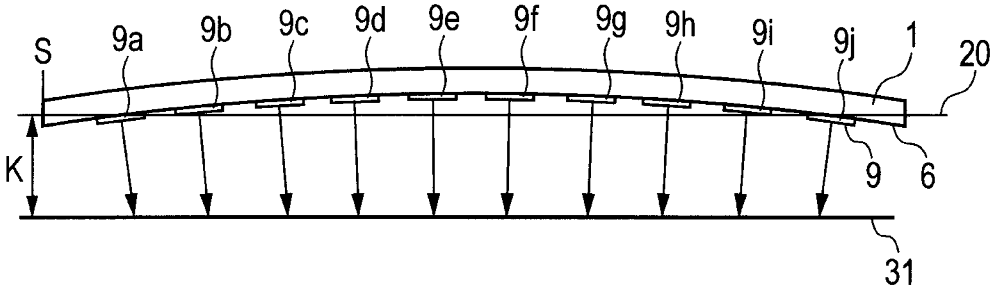
FIGS. 8A, 8B, 8C and 8D are diagrams illustrating a process of calculating the amount of landing deviation.
Figure 8B:
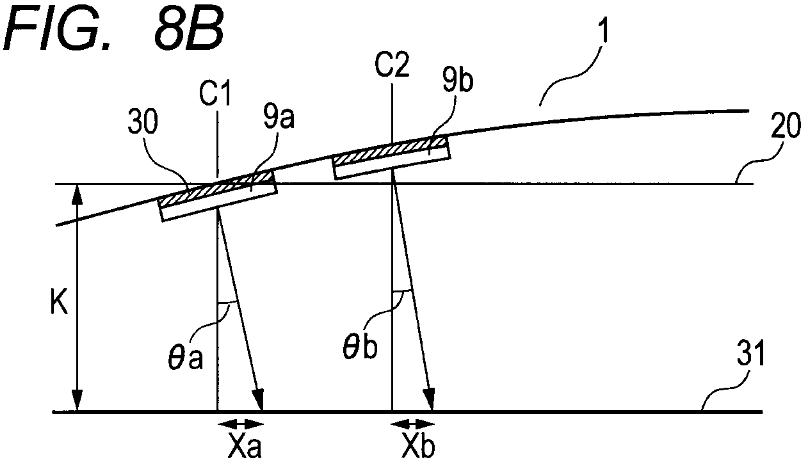

Next, the amount of deviation of landing of ink is calculated in step S106. Step S106 will be described with reference to FIGS. 8A to 8D. FIG. 8A is a side view illustrating a case where the recording element substrates 9*a* to 9*j* are tightly arranged on the recording element substrate bonding surface 6 at the predetermined positions described in step S101, and ink is discharged onto a recording medium 31 that is parallel to the reference surface 20 and is located at a position distanced from the reference surface 20 by a predetermined distance K. FIG. 8B is an enlarged view of the vicinity of the recording element substrates 9*a* and 9*b*. The amount of deviation of landing is calculated by assuming that each of the recording element substrates 9*a* to 9*j* is bonded by using an adhesive 30 having a thickness t. However, actually, step S106 is performed before the recording element substrates 9*a* to 9*j* are mounted on the support substrate 1.

The discharge direction of ink is a direction to which the discharge port is directed, that is, a direction deviated from a direction perpendicular to the reference surface 20 by the slope θ of the arrangement portion that is calculated in step S104. Accordingly, the landing position of an ink droplet discharged from each recording element substrate 9 is deviated from the landing position of the ink droplet in a case where there is no warpage (slope θ), that is, a position (predetermined position) at which a line extending from the recording element substrate 9 in a direction perpendicular to the reference surface 20 intersects the recording medium 31. The calculation of the amount X of deviation of landing can be performed through the following equation.

$$\text{Amount of Deviation of Landing } X=(K+R-T-t)\times\tan\theta$$

Here, K is a distance between the reference surface and a recording medium.

R is the amount of the warped state of the recording element substrate arrangement portion that is calculated in step S105.

T is the thickness of the recording element substrate that is measured in step S102.

t is the thickness of an adhesive.

θ is the slope of the recording element substrate arrangement portion that is calculated in step S104.

The amounts of deviation of landing, which are calculated for the recording element substrates 9*a* to 9*j* by using the above-described equation, are denoted by Xa to Xj. In a case where the sign of the amount X of deviation of landing is positive, the landing position is deviated from the center position C of the recording element substrate arrangement portion 8 to the opposite side of the base point S (the right side in the figure). On the other hand, in a case where the sign of the amount X of deviation of landing is negative, the landing position is deviated from the center position C to the base point S side (the left side in the figure).

Figure 8C:
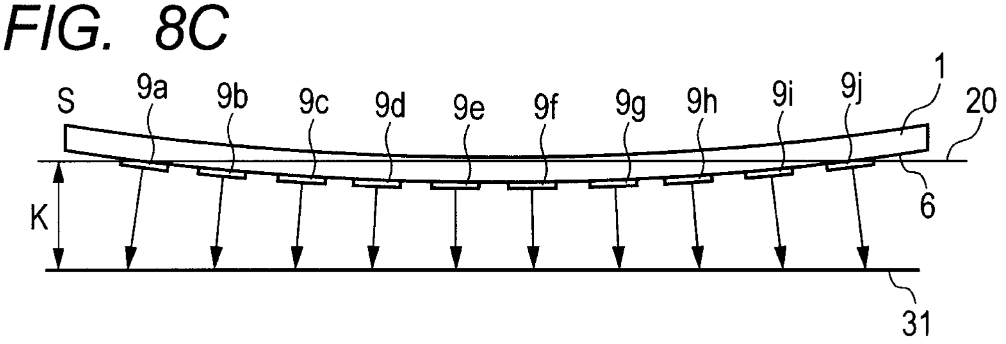
Figure 8D:
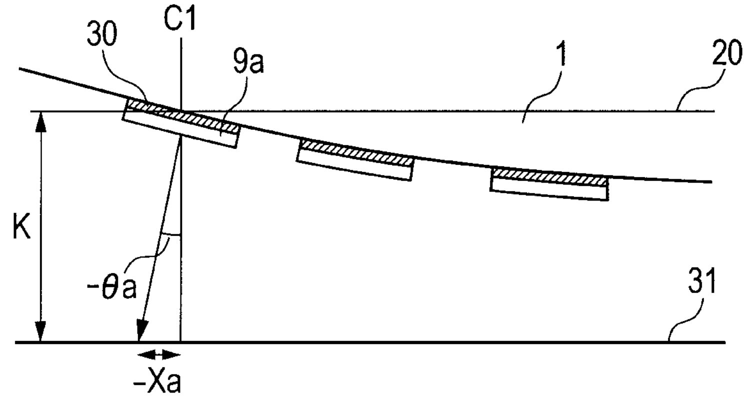

When the support substrate is in a shape that is convex downward as in FIG. 8C, as illustrated in the enlarged view of FIG. 8D, the landing position from the recording element substrate 9*a* is shifted from C1 to the base point S side (the left side in the figure), and the amount Xa of deviation has a negative value.

Finally, the actual arrangement positions 8*a*' to 8*j*' of the recording element substrates 9*a* to 9*j* are calculated in step S107. Step S107 will be described with reference to FIG. 9. The position (the position of the end portion located on the closer side of the base point S) of the arrangement portion 8*a* at which the recording element substrate 9*a* is arranged is a position A1' corrected (added or subtracted) from A1 illustrated in FIG. 3A by the distance corresponding to the amount Xa of deviation of landing that is calculated in step S106 from the position L that is at a predetermined distance distanced from the base point S. Next, the position of the arrangement portion 8*b* is a position A2' corrected from A2, which is a predetermined position, by a distance Xb. Similarly after that, the positions at which the recording element substrates 9*c* to 9*j* are arranged are A3' to A10'. Here, the pitch P is set to a large value, so that a gap between the arrangement positions 8*a* to 8*j* before correction has a size within which the arrangement position is allowed to be corrected in step S107.

A recording operation using a recording head that is manufactured by bonding and fixing the recording element substrates 9*a* to 9*j* at the actual arrangement positions 8*a*' to 8*j*' corrected in the above-described step can be performed well without being influenced by the warping of the support substrate 1, variations in the thicknesses of the recording element substrates 9*a* to 9*j*, and the like. Accordingly, a high recording quality can be realized.

According to general technique, since the thickness of an adhesive that bonds each recording element substrate to the support substrate is not uniform, heat conductivity differs for each recording element substrate. However, according to this embodiment, since the thickness t of the adhesive bonding each recording element substrate 9 to the support substrate 1 can be formed to be uniform, the heat conductively for each recording element substrate can be uniform.

A method for manufacturing an ink jet recording head according to a second embodiment will now be described. The second embodiment is the same as the first embodiment illustrated in the flowchart illustrated in FIG. 2 except for the number of the measurement points used for measuring the shape of the support substrate 1 in step S101. Also in this embodiment, ten recording element substrates 9*a* to 9*j* are assumed to be arranged on one support substrate 1.

Since the diagrams referred to for describing the shape measuring step S101 for a support substrate according to this embodiment are the same as illustrated in FIGS. 3A to 3C referred to in step S101 of the first embodiment, the step will be described with reference to FIGS. 3A to 3C. In the first embodiment, the heights of three places including both ends and the center of each of the arrangement portions 8*a* to 8*j* for each recording element substrate, that is, the heights of 30 places on the entire substrate 1 are measured. According to this embodiment, the height of the end portion, located on one end portion side, of the arrangement portion arranged at a position closest to one end portion of the support substrate 1 and the height of the end portion, located on the other end portion side, of the arrangement portion arranged at a position closest to the other end portion of the support substrate 1 are acquired. In addition, the height of any one end portion of both end portions of the arrangement portion arranged near the center of the support substrate 1 is acquired. Specifically, the heights of only three places including the measurement points A1, A6, and B10 illustrated in FIGS. 3A and 3B are measured. These three places are the measurement point A1 that is located closest to the base point S, the measurement point B10 that is located farthest from the base point S, and the measurement point A6 (or the measurement point B5 instead of the measurement point A6) that is located near the center. Then, as for 27 places that have not been subjected to the height measurement, the following step is performed using interpolated values that are calculated based on the measured values of the three places.

Next, the method for interpolating the heights of the places at which the heights are not measured will be described with reference to FIG. 10. FIG. 10 is a graph acquired by plotting the heights of three places A1, A6, and B10 at which the heights are measured and joining the plotted points by a line. In the figure, the horizontal axis represents the distance from the base point S, and the vertical axis represents the height. Since the distances of the places, at which the heights are not measured, from the base point S are predetermined as predetermined positions, an estimated value of the height of each measurement point can be acquired from the graph illustrated in FIG. 10.

This method is effective in shortening the time required for the measurement process in a case where the behavior of the warping of the support substrate 1 is in a relatively simple shape such as that when there is only one local maximum point or one local minimum point. In step S102 and steps subsequent to step S102, the same as that of the first embodiment is performed, whereby excellent recording may be performed.

In this embodiment, the heights of three places are measured, and the heights of other places are acquired from the graph. The number of the measurement points at which the heights are measured may be three or more. As the number of the measurement points at which the heights are measured increases, the accuracy and precision in measurement further improves.

A method for manufacturing an ink jet recording head according to a third embodiment will now be described. The third embodiment is the same as the first embodiment illustrated in the flowchart illustrated in FIG. 2 except for the content of the shape measuring step S101 for a support substrate 1. The other steps are the same as those of the first embodiment, and thus the description thereof will not be repeated.

In this embodiment, when the shape of the support substrate 1 is measured, the measurement operation is performed in the same state in terms of the recording head, that is, in the state in which the recording head of the recording apparatus performs a recording operation. The measurement of the shape of the support substrate 1 according to the first embodiment is performed in the state in which the support substrate 1 is placed on the plate stand 2 at the ambient temperature (about 25° C.) at which the recording head is manufactured. When a recording operation is actually performed by using the recording head, the recording head is fixed to a head mounting portion of the recording apparatus by inserting and fastening bolts into bolt holes 3 formed on both ends of the support substrate 1. In addition, when the recording operation is performed, ink is used while it is kept warm at 35° C. Thus, in this embodiment, in order to measure the shape of the support substrate 1 in the same state as that under the ambient temperature of the actual use, both ends of the support substrate 1 are fixed by using the bolts, and the shape is measured at the ambient temperature of 35° C. The necessity thereof will be described below.

FIGS. 11A to 11C are diagrams illustrating the deformation of a plate 101. FIG. 11A illustrates the shape of the plate 101 at ambient temperature at the time of manufacture. FIG. 11B illustrates a grown state of the plate due to thermal expansion in a case where the temperature at the time of use is higher than that at the time of manufacture. FIG. 11B illustrates the state in which there is no blocking object or the like at both ends of the plate 101 in the longitudinal direction and there is no factor blocking thermal expansion. FIG. 11C illustrates the state in which the temperature rises up to a temperature at the time of use in the state in which the plate 101 is fixed by using bolts 106 with both ends thereof interposed between fixtures 105 at the ambient temperature at the time of manufacture. In FIG. 11B, the length of the plate 101 is longer than that illustrated in FIG. 11A. However, in FIG. 11C, since both the ends of the plate 101 are fixed, the plate 101 cannot be lengthened in the longitudinal direction and deforms in a warped state. In addition, in FIG. 11C, the plate 101 is warped so as to be convex upward. However, actually, the plate 101 may be convex downward. In addition, in a case where the plate 101 is warped under the condition of temperature in manufacturing, the amount of the warped state further increases.

Thus, in the shape measuring step S101 for the support substrate 1 according to this embodiment, the entire shape measuring apparatus for the support substrate 1 that is illustrated in FIG. 1 is enclosed by a temperature-controlled casing (not illustrated in the figure). In addition, both ends of the support substrate 1 are fixed to the plate stand 2 by using bolts not illustrated in the figure in the state in which the inside of the temperature-controlled casing is maintained at 25° C., and then, after the inside of the temperature-controlled casing is maintained at 35° C., the measurement operation is performed. As above, when the measurement ambient temperature is raised after the support substrate 1 is fixed, the support substrate 1 deforms due to thermal expansion. However, since both the ends are fixed, the length grows and the support substrate 1 deforms to be warped. In addition, the positions at which the shape of the support substrate 1 is measured, and the following step S102 are the same as those of the first embodiment. According to this embodiment, since the measurement operation is performed under the environment of actual use, the landing positions at the time of recording can be adjusted with high accuracy and precision.

In this embodiment, since the installation of the recording head to the recording apparatus is achieved by the fixing of both ends of the support substrate with bolts, fixation at the time of measurement is similarly performed. However, the invention is not limited thereto. Thus, it is important to perform a measurement operation by using the same method as that used for installing the recording head to the recording apparatus or a method similar thereto.

A method for manufacturing an ink jet recording head according to a fourth embodiment will now be described. The fourth embodiment is the same as the first embodiment illustrated in the flowchart illustrated in FIG. 2 except for the shape measuring step S101 for the support substrate and the reference surface setting step S103. The other steps are the same as those of the first embodiment, and thus the description thereof will not be repeated. When the same configuration as that of the first embodiment is mentioned, the same reference numeral as that of the first embodiment will be used.

Figure 12A:
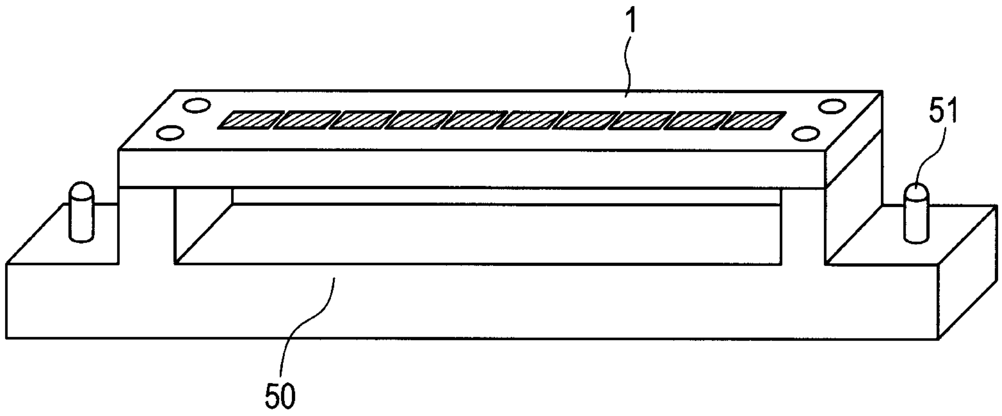
FIGS. 12A and 12B are schematic configuration diagrams of a recording head according to a fourth embodiment.
Figure 12B:
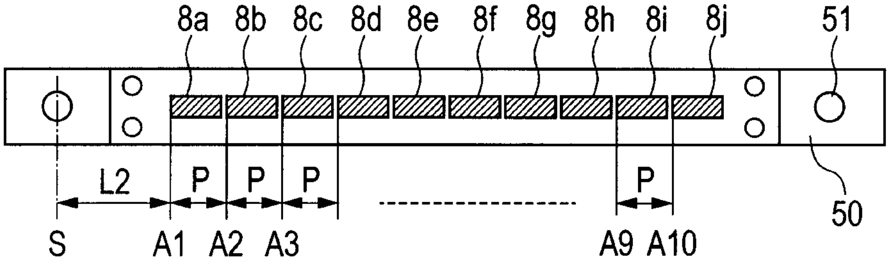

FIGS. 12A and 12B illustrate the schematic configuration diagrams of a recording head manufactured according to this embodiment. FIG. 12A is a perspective view illustrating the state in which the support substrate 1 is fixed to a support substrate fixing stand 50 (hereinafter, referred to as a "fixing stand"), and FIG. 12B is a plan view thereof. When the recording head of this embodiment is mounted on the recording apparatus, both ends of the support substrate 1 and the fixing stand 50 are fixed with bolts, and positioning pins 51 disposed near both end portions of the fixing stand 50 are fixed so as to be brought into contact with head receiving portions, which are not illustrated in the figure, inside the recording apparatus. The leading end of the positioning pin 51 is in a spherical shape.

In this configuration, the arrangement portions 8*a* to 8*j* are arranged such that, the end portion A1, located on the base point S side, of the arrangement portion 8*a* is located at a position distanced from the center of the positioning pin 51 located on one corner (the left side in FIGS. 12A and 12B) as the base point S by a predetermined distance L2, and thereafter the arrangement portions 8*b* to 8*j* are arranged at a predetermined pitch P.

In the shape measuring step S101 for the support substrate 1 according to this embodiment, similarly to the method used for mounting the recording head on the recording apparatus, both ends of the support substrate 1 and the fixing stand 50 are fixed with bolts, and the heights of the arrangement portions 8*a* to 8*j* are measured by using a measurement device having the same configuration as that illustrated in FIG. 1. At that time, the heights of the leading end portions of two positioning pins 51 are measured together. Furthermore, as described in the third embodiment, it is preferable that the measurement operation is performed at a measurement ambient temperature (35° C.) that is the same as that at the time of recording.

Figure 13:
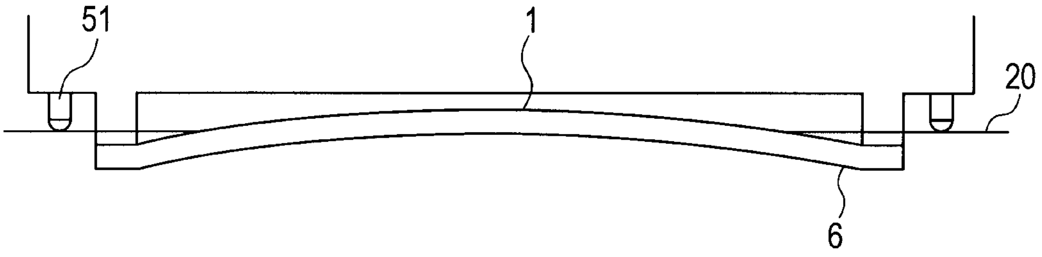
FIG. 13 is a side view of a support substrate mounted on a fixing stand when a recording element substrate bonding surface faces down.

Next, the reference surface setting step S103 according to this embodiment will be described with reference to FIG. 13. FIG. 13 is a diagram illustrating the side portion of the support substrate 1 mounted on the fixing stand 50 when the recording element substrate bonding surface 6 faces down. The reference surface of the first embodiment is a surface on which the heights of the outermost portions of the arrangement portions 8 are the same. However, in this embodiment, a surface on which the leading end portions of the two positioning pins 51 are on the same plane is used as the reference surface 20.

Here, step S102 of measuring the thicknesses of the recording element substrates, step S104, and steps subsequent to step S104 are the same as those of the first embodiment. By performing such steps, excellent recording can be performed even when the portion used for determining the position at the time when the recording head is mounted on the recording apparatus is spaced apart from the recording element substrate.

A fifth embodiment will now be described. In the first to fourth embodiments, the landing positions are calculated without actually discharging ink. However, in this embodiment, based on a result of actual discharging of ink, the arrangement positions of the recording element substrate that is manufactured thereafter are corrected. Hereinafter, detailed description will be followed with reference to drawings. When the same configuration as that of the first embodiment is denoted, the same reference numeral as that of the first embodiment will be used.

Figure 14:
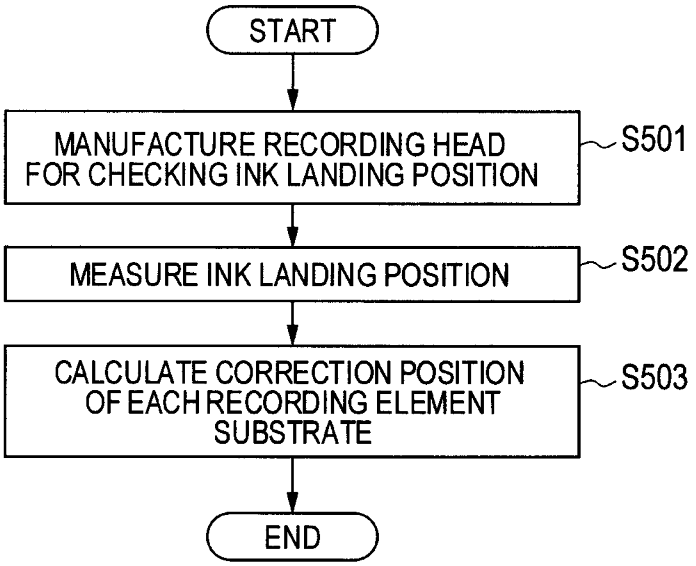
FIG. 14 is a flowchart of a method for manufacturing a recording head according to a fifth embodiment.

The flowchart of a method for manufacturing a recording head according to this embodiment is illustrated in FIG. 14.

First, a recording head used for checking a landing position is manufactured in step S501. Step S501 will now be described. By arranging recording element substrates 9*a* to 9*j* at predetermined positions on a support substrate 1, the manufacturing of the recording head is completed. Here, the predetermined positions are the predetermined positions illustrated in FIGS. 3A to 3C that have been described in step S101 of the first embodiment, and thus, the description thereof will not be repeated.

Next, the landing positions are measured in step S502. Step S502 will now be described. In step S502, the recording head manufactured in step S501 is mounted on a recording apparatus, and ink is actually discharged from all the discharge ports onto a recording medium.

Figure 15A:
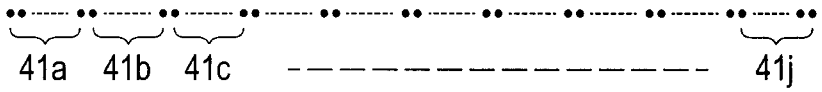
FIGS. 15A and 15B are plan views of a recording sheet on which ink lands.
Figure 15B:
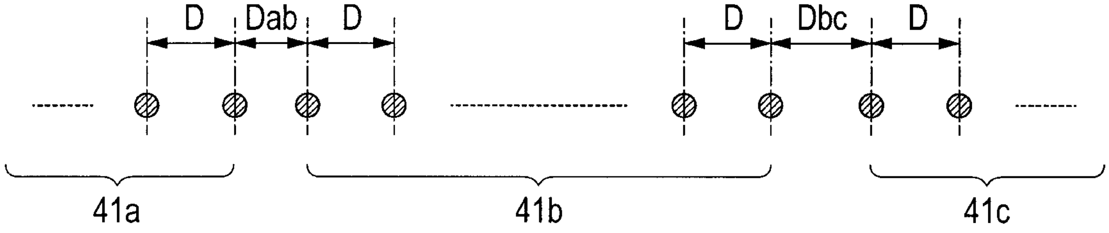

FIGS. 15A and 15B illustrate plan views of the state in which ink lands on a recording medium. FIG. 15A illustrates all the landing dots. Landing dots formed by ink discharged from the recording element substrate 9*a* are denoted by 41*a*, landing dots formed by ink discharged from the recording element substrate 9*b* are denoted by 41*b*, and similarly landing dots are respectively denoted by 41*c* to 41*j*. FIG. 15B is an enlarged view of the vicinity of the landing dots 41*b*. In order to allow the description to be easily understood, a gap between landing dots formed by ink discharged from the same recording element substrate 9 is assumed to be the same gap D. In FIG. 15B, a gap between landing dots formed by ink discharged from adjacent recording element substrates (for example, the recording element substrate 9*a* and the recording element substrate 9*b*), is different from the constant gap D due to the warped state of the support substrate 1 or the like. A gap between landing dots formed by ink discharged from the recording element substrates 9*a* and 9*b* is denoted by Dab, and a gap between landing dots formed by ink discharged from the recording element substrates 9*b* and 9*c* is denoted by Dbc, and similarly after that, and a gap between landing dots formed by ink discharged from the recording element substrates 9*i* and 9*j* is denoted by Dij. The gaps Dab to Dij between the landing dots are precisely measured by using a microscope or the like.

Next, the correction positions of the recording element substrates 9*a* to 9*j* are calculated in step S503. This step will now be described. In this embodiment, a method for correcting the positions of the arrangement portions 8*b* to 8*j* with the position of the arrangement portion 8*a* being fixed will be described. However, for example, the positions of the arrangement portions 8*a* to 8*d* and 8*f* to 8*j* may be corrected by using the arrangement portion 8*e* located near the center as a reference.

First, in order to calculate the corrected position of the arrangement portion 8*b*, the amount Δab of deviation of the gap Dab between landing dots from the constant gap D is calculated. As a result, when Δab is "0," the arrangement portion 8*b* is maintained at the current position without any change. When Δab is a positive value, the arrangement portion 8*b* is placed closer to the arrangement portion 8*a* by Δab. In contrast, when Δab is a negative value, the arrangement portion 8*b* is separated away from the arrangement portion 8*a* by Δab. The position calculated as above is set as the position of the arrangement portion 8*b* after correction.

Next, the corrected position of the arrangement portion 8*c* is calculated. Here, as the distance compared with the constant gap D, a value acquired by adding the correction amount Δab of the arrangement portion 8*b* calculated in advance to Dbc measured in step S502 is used as Δbc. Then, similarly to the above-described step, the corrected position of the arrangement portion 8*c* is calculated. As a result, when Δbc is "0," the arrangement portion 8*c* is maintained at the current position without any change. When Δbc is a positive value, the arrangement portion 8*c* is placed closer to the arrangement portion 8*b* by Δbc. In contrast, when Δbc is a negative value, the arrangement portion 8*c* is separated away from the arrangement portion 8*b* by Δbc. Thereafter, by using the same method, the corrected positions of the arrangement portions 8*d* to 8*j* are calculated.

Then, when the recording element substrates are arranged at the positions after correction in a recording head manufactured thereafter, the gaps between landing dots formed by ink discharged from the recording element substrates 9*a* to 9*j* can be configured as the constant gap D, whereby excellent recording can be acquired.

Since only the recording head used for checking landing positions need to be measured, this embodiment is advantageous in terms of time in a case where the individual variation in the shape and the deformation of the support substrate 1 is small.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-060846, filed Mar. 17, 2010, which is hereby incorporated by reference herein in its entirety.

What is claimed is:

1. A method for manufacturing an ink jet recording head in which a plurality of recording element substrates used for discharging ink are arranged onto a support substrate, the method at least comprising:

measuring heights of a main surface of the support substrate at least at three measurement points;

setting a reference surface that passes through two measurement points of the main surface out of the measurement points;

acquiring a distance from the measurement point that is not included in the two measurement points on the reference surface to the reference surface;

calculating amounts of deviation of landing that are differences between positions at which lines extending from the recording element substrates in a direction perpendicular to the reference surface intersect a recording medium and positions at which lines extending in directions to which ink discharge ports of the recording element substrates are directed intersect the recording medium when it is assumed that the recording element substrates are arranged in a plurality of arrangement portions disposed on the support substrate, and the recording medium is arranged at a position separated from the reference surface by a predetermined distance so as to be parallel to the reference surface; and determining arrangement positions of the recording element substrates on the support substrate by correcting the positions of the arrangement portions according to the amounts of deviation of landing.

2. The method according to claim 1, wherein the main surface is a surface on which the recording element substrates are arranged.

3. The method according to claim 1, wherein the reference surface is a surface on which an end portion, located on one end portion side, of the arrangement portion located at a position closest to one end portion of the recording element substrate and an end portion, located on the other end portion side, of the arrangement portion located at a position closest to the other end portion of the recording element substrate are positioned on a same horizontal plane.

4. The method according to claim 1, wherein the arrangement portions are disposed on the support substrate at the same pitch.

5. The method according to claim 1, wherein a shortest distance from the reference surface to a center position of each of the arrangement portions is acquired as an amount of a warped state of each of the arrangement portions.

6. The method according to claim 1, wherein at least a height of an end portion, located on one end portion side, of the arrangement portion arranged at a position closest to one end portion of the support substrate, a height of an end portion, located on the other end portion side, of the arrangement portion arranged at a position closest to the other end portion of the support substrate, and a height of any one end portion of both end portions of the arrangement portion that is arranged near a center of the support substrate are acquired.

7. The method according to claim 6, wherein, when the predetermined distance from the reference surface to the recording medium is denoted by K, the amount of the warped state of the recording element substrate is denoted by R, a thickness of the recording element substrate is denoted by T, a thickness of the adhesive is denoted by t, a slope of the arrangement portion is denoted by θ, and an amount of deviation of landing is denoted by X, the amount X of deviation of landing is acquired by the following equation:

$$X=(K+R-T-t)\times\tan\theta.$$

8. The method according to claim 7, wherein the arrangement position of each of the recording element substrates is determined by correcting the position of the arrangement portion according to the amount X of deviation of landing.

9. The method according to claim 1, wherein the measuring of heights of the main surface of the support substrate, the setting of a reference surface, the acquiring of a distance between the measurement point and the reference surface, the calculating of amounts of deviation of landing, and the determining of arrangement positions are performed while both end portions of the support substrate are fixed.

10. The method according to claim 1, wherein the measuring of heights of the main surface of the support substrate, the setting of a reference surface, the acquiring of a distance between the measurement point and the reference surface, the calculating of amounts of deviation of landing, and the determining of arrangement positions are performed at ambient temperature of actual use.

* * * * *